United States Patent
Wahlberg

[15] 3,686,608
[45] Aug. 22, 1972

[54] SPEED REDUCER AND POSITIONING DEVICE

[72] Inventor: Eric C. Wahlberg, 32 8th St., Stamford, Conn. 06905

[22] Filed: June 1, 1970

[21] Appl. No.: 41,820

[52] U.S. Cl..............338/162, 317/249 R, 317/253, 74/705
[51] Int. Cl. .....H01c 5/02, H01h 85/14, H01h 85/16
[58] Field of Search.....74/705, 674, 665 P; 338/145, 338/167; 317/249 R, 253, 249 D

[56] References Cited

UNITED STATES PATENTS

| 3,360,757 | 12/1967 | Wahlberg | 338/162 |
| 3,560,906 | 2/1971 | Wahlberg | 338/162 X |
| 1,445,741 | 2/1923 | Blackwell | 74/705 |
| 3,273,421 | 9/1966 | Jones | 74/705 |
| 3,405,571 | 10/1968 | Mersch | 74/674 |
| 3,429,200 | 2/1969 | Green | 74/674 |

*Primary Examiner*—Arthur T. McKeon
*Attorney*—Alfred E. Miller

[57] ABSTRACT

Two mechanical elements are mounted for independent rotation in the same direction about a common a axis. The difference of the rates of rotation of the two mechanical elements is converted into a resultant mechanical rate of rotation of an output shaft. An electrical element may be mounted on each of the mechanical elements in electrical coactive relationship providing a variable electrical value dependent on the relative angular displacement of the two mechanical elements when the electrical elements are connected into an electrical circuit.

7 Claims, 7 Drawing Figures

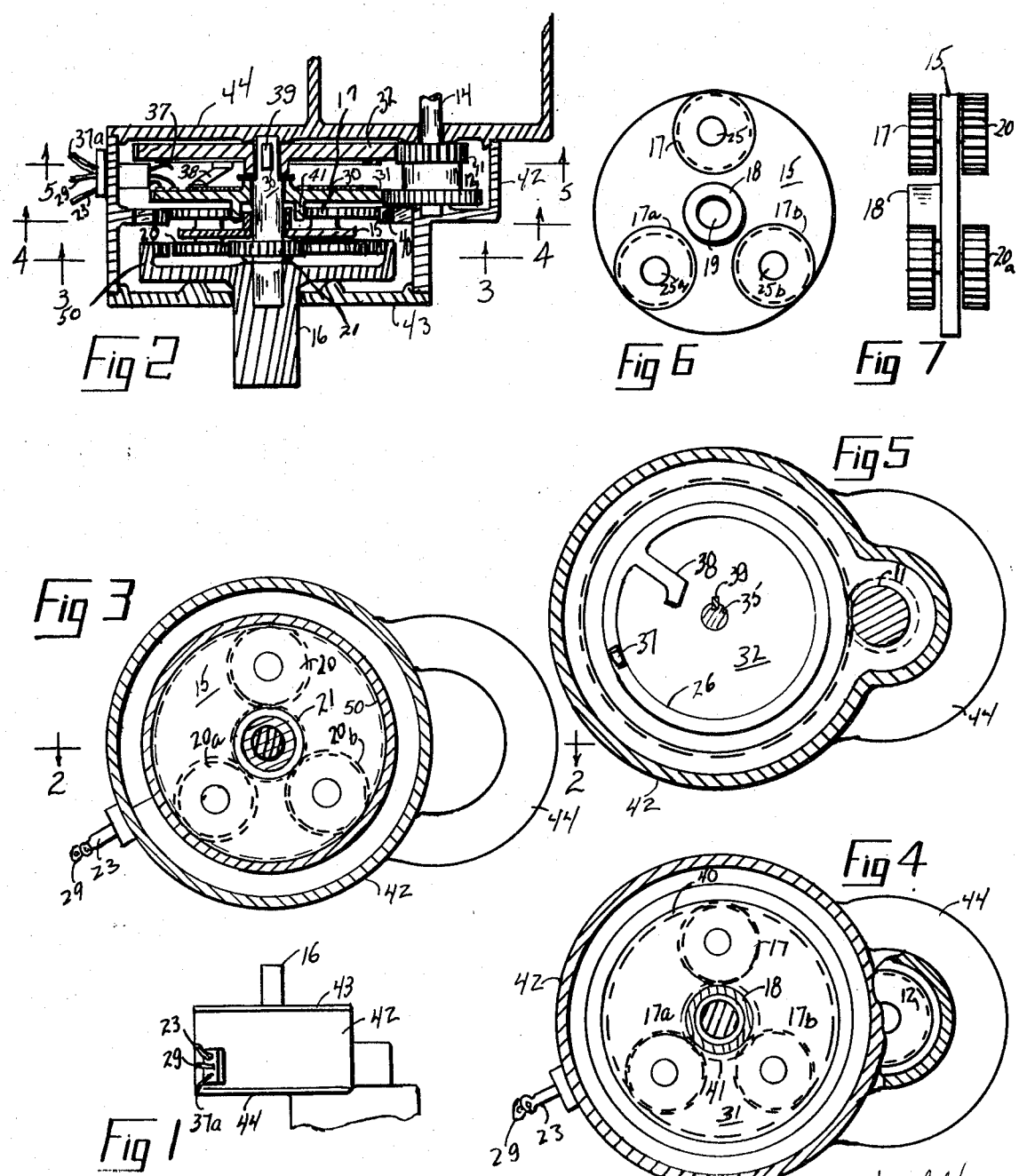

SPEED REDUCER AND POSITIONING DEVICE

This invention relates to mechanical devices normally known as gear reducers, speed reducers and positioning devices. The invention is further related to such devices as above wherein the relative rate of speed or the relative position of the output shaft is remotely indicatable by electrical elements included on the mechanical devices and connected into suitable electrical circuitry.

An object of this invention is to provide a novel unusually large ratio gear reduction device.

Another object of this invention is to provide a unit using spur and internal gears. Another object is to provide an electrical output which is responsive to the angular position of the mechanical device.

Other objects of the invention will become evident from the broad interpretations of the specifications and the drawings.

These and other objects of the invention are achieved in an arrangement wherein a pair of elements such as discs of different diameters are free to rotate about a common shaft. The rotation may be caused by the rotation of a rotatable member having two different diameters mating with the circumferences of the aforementioned elements. The radius of one element added to the radius of the diameter of the rotatable member cooperating with that element must equal the radius of the second element added to the other diameter of the rotatable member mating with that element. Sun gears are provided to transfer the motion of the elements to corresponding planet gears which are independently and rotatably mounted to on pins integral with a disc rotatably mounted on the shaft supporting the aforesaid elements. One group of planet gears meshes with the sun gear of one element and a stationary internal gear mounted in the housing of the unit. The other group of planet gears mesh with the sun gear of the other element and the internal gear of the output shaft. As a result, the ratio of the input speed to the rotatable member to the output speed will be the difference of the cumulative ratios of the gear trains associated with the respective elements. Proper mounting of electrical elements on the mechanical elements together with terminals and pick-off provide an electrical output representative of the position of the elements. The assembly is compactly contained in a housing to form a compact product according to the invention.

One embodiment of the invention is illustrated in FIGS. 1–7 in which;

FIG. 1 illustrates a side view of the invention;

FIG. 2 is a cross-section of FIG. 1;

FIG. 3 is a cross-section of the invention taken along lines 3—3 of FIG. 2;

FIG. 4 is a cross-section of the invention taken along line 4—4 of FIG. 2;

FIG. 5 is a cross-section of the invention taken along lines 5—5 of FIG. 2;

FIG. 6 is a frontal view of the planetary gearing assembly; and

FIG. 7 is a side view of the planetary gearing assembly.

Other embodiments are afforded by this invention with variable condensers, impedance, etc. in which similar mounting on the mechanical elements when rotated they are properly identified with each other as to electrical properties and mechanically. Also a plurality of these assemblies may be operated from one input to obtain several outputs which are similar or different. It is therefore important not to limit the scope of this invention to those embodiments illustrated but consider it in the broadest aspect.

Reference is now made to FIGS. 1–7 which illustrate one embodiment of the invention. Included in the embodiment is case 42, cover 43, shaft 16, upper cover 44, upper disc 32, lower disc 31, pinion shaft 14, terminals 29, 23, 37a, sliding contact 38 attached to conductive ring 26 located on the under side of upper disc 32, sliding contact 37 sliding on ring 26, and a resistive layer 30 located on the upper surface of the lower disc 31. Sliding contact 38 slides on the resistive layer 30. Sliding contact 37 extends out of the housing 42 to form terminal 37a. Terminals 29 and 23 extend into housing 42 and contact respective conductive rings located on upper surface of lower disc 31 and each being connected to respective ends of resistance layer 30.

Following the electrical path we find that terminal 29 may be used as one connection point from where current will travel to resistive layer 30 to terminal 23. Also, it may travel to resistive layer 30 to sliding contact 38 to contact 37 which becomes terminal 37a outside the case 42. The amount of resistance included in the second path is dependent upon the position of sliding contact 38 on resistive layer 30. This in turn is dependent upon the positions of the discs 31 and 32. The position of discs 31 and 32 are determined by the rotation of pinion shaft 14.

Disc 31 is rotatably mounted on shaft 35. Disc 32 is larger in diameter than disc 31 and is fixedly mounted on shaft 35 by means of key 39 and located just above disc 31. Each have, for the purpose of this description, gear teeth on their circumferences.

Pinion shaft 14 has two sets of gear teeth—one set having a different pitch diameter than the other set. The smaller diameter matches, when assembled to the unit, with the larger diameter upper disc 32 gear teeth and the larger diameter pinion gear matches the smaller disc 31 gear teeth. In each case, the sum of the pitch radii and the disc gear must equal the center line distance between the shaft 14 and 35. Thus, when pinion shaft 14 is turned, both discs will also rotate and in proportion to the circumferences of the contacting gears. Large disc 32 will turn slower than small disc 31 in that circumference travel of the smaller pinion gear is less than that for the larger pinion gear which drives the smaller disc 31. Thus, though both discs are rotating as a result of rotation of the pinion shaft, the smaller disc will be going faster and, after a predetermined number of turns of the pinion shaft 14, will lap disc 32. Thus, with proper design, very high accuracy may be obtained from small increments of rotation of the pinion shaft 14 applied to displace discs 31 and 32.

The shaft 35 has a gear 21 located near the end opposite to that having the keyway. The same type of gear is placed on the under side of gear 31. A planet gear holder 15 is located between the lower disc gear 31 and gear 21 on shaft 35. The gear holder 15 is rotatably mounted for independent rotation on shaft 35. In FIG. 6 and 7 there are shown two sets of planet gears having three gears each. Planet gears 17, 17a, and 17b are located on one side of the planet gear holder 15 and the second set of planet gears 20, 20a, and 20b are located on the other side of the planet gear holder. Each of the gears is mounted to an axle respectively 25, 25a, and 25b with the other set of planet gears similarly mounted to axles. Each gear is free to rotate about the respective axle.

However, when the planet gear assembly is assembled to the shaft 35, planet gears 17, 17a, and 17b mesh with gear 41 on disc gear 31 and with an internal gear 40 mounted fixedly to the housing 42. The other set of planet gears 20, 20a, and 20b mesh with gear 21 on shaft 35 and with internal gear 50 attached to output shaft 16. Shaft 35 is mounted in cover 44 and output shaft 16.

The shaft 14 may be rotated by the use of a knob or as is shown by a motor or other means to adjust the output shaft for speed or for positioning to very accurate angular position.

When disc gear 31 is driven by gear 12 gear 41 drives planet gears 17, 17a, and 17b which in turn drive against stationary internal gear 40 to drive planet gear holder 15. When disc gear 32 is driven by gear 11 shaft 35 is rotated through key 39. This causes integral gear 21 to rotate and planet gears 20, 20a, and 20b to rotate. Since planet gear holder 15 is already rotating, planet gears 20, 20a, and 20b would be rotating around gear 21. But gear 21 is rotating in the same direction as gear 41 and at a slower speed. Therefore, gears 20, 20a, and 20b will be rotating around their respective axles 25, 25a, and 25b at a slower speed than gears 17, 17a, and 17b. Since internal gears 50 and 40 are identical and gear 40 is stationary, gear 50 will rotate at a rate of speed which is the difference between the speeds of disc gears 32 and 31. The direction of rotation would be the same as that of the planet gear holder 15.

Should the speed of rotation of gear 21 be greater than that of gear 41, the direction of rotation would be opposite to that of planet gear holder 15. The direction of rotation of the output shaft 16 will depend, therefore, on whether gear 21 is slower or faster than gear 41 and, consequently, the disc gear 31 and 32 size relationship. The planet gear holder 15 will rotate in the same direction as the gear 41 and, therefore, gear disc 31.

The speed reducer can be further refined by alteration of the planet gears 17 and 20 and gears 41 and 21 respectively either collectively or individual sets.

Smaller units may be molded plastic parts while larger units may be made of castings or machined parts. Bearings are added as needed for casting assemblies and machined parts.

By mounting the stationary plates of a condenser on disc 31 and the moveable plates on the disc 32 and holding their space relationship by locating discs 32 and 31 accurately from each other is it easily seen that this invention is applicable to this variation as well as other electrical and mechanical assemblies where accurate positioning or high speed reductions is important.

There has accordingly been described and shown herein a novel and new means for obtaining unusually high ratio gear reduction in a small unit together with a novel means to indicate the rate of speed and/or the accurate positioning of the output shaft. There has also been described a novel means for rotating two or more items at relative speeds to each other and to mechanically and electrically determine this difference and represent this difference electrically and mechanically. The difference is mechanically represented by the motion or position of the output shaft. The method is simple, requiring few parts, may be miniaturized, and may be manually, motorized and remotely controlled. Units may be designed for a plurality of similar or different or a combination of similar and different outputs from one input. Other units may be designed for more than one input by driving each of the pinion gears 11 and 12 from a separate source in which one of the gears would be free to rotate on shaft 14. It is therefore important that, while I have described embodiments of my invention in this application, it is not the intent to limit the scope of these since the invention may be used to control many types of mechanical and electrical devices with proper coordinated design. Therefore the claims appended hereto should not be limited to the embodiment shown.

I claim:

1. A device for connection to a mechanism for adjusting to a selected mechanical value from a multiplicity of mechanical values in said mechanism, comprising a housing, a pair of elements, means mounting said elements in said housing for independent rotation about a common axis; a first means for simultaneously rotating each of said pair of elements in the same direction, said first means including a rotatable drive member engageable with each of said pair of elements for angular displacement of said elements in response to rotation of said drive member, the rate of displacement of said elements being different with respect to each other; a second means being a double planetary gear reduction assembly co-acting with each of said pair of elements and responsive thereto for determining the difference of said rate of displacement of each of said pair of elements; and an output means co-acting with and responsive to said second means.

2. The device as defined in claim 1 wherein one of said pair of elements includes a first disc having an electrical surface layer deposited on its face and the other of said pair of elements includes a second electrical surface layer mounted on its face, and said electrical surface layers of said first and second discs being in electrically co-acting relationship with each other, said electrical surface layer of said first disc including a resistive layer and said electrical surface layer of said second disc including electrical contacts slideable contacting with said resistive layer of said first disc.

3. A device for connection to a mechanism for adjusting to a selected mechanical value from a multiplicity of mechanical values in said mechanism comprising a housing, a pair of elements mounted in said housing for independently rotating about a common axis; a first means for rotating one element of said pair of elements, said first means including a rotatable member engageable with said one element of said pair of elements; a second means for rotating the second element of said pair of elements, said second means including a rotatable member engageable with said second element of said pair of elements; a third means mounted in said housing independently rotating about said common axis and coacting with each of said elements for determining the difference of rate of displacement of each elements of said pair of elements including a double planetary gear reduction assembly; and an output means co-acting with and responsive to said third means to provide an output which represents the rate of displacement of said pair of elements.

4. The device as defined in claim 3 wherein said double planetary gear reduction assembly includes a planet gear holder, a first set of planet gears and a second set of planet gears both mounted on said planet gear holder, a stationary internal gear mounted on said housing and a rotatable internal gear mounted integrally to said output means, said first set of planet gears coacting with said one element of said pair of elements and said stationary internal gear, said second set of planet gears coacting with said second element of said pair of elements and said internal gear mounted integrally to said output means.

5. The device as defined in claim 3 wherein said pair of elements include toothed elements and said rotatable member includes toothed members engageable with said toothed elements.

6. The device as defined in claim 3 wherein said pair of elements includes a first element having an electrical surface layer deposited on its face and a second element having an electrical surface layer mounted on its face, said surface layers of said first and second elements being in electrically coacting relationship with each other, said electrical surface layer of said first element including a first condenser element and said electrical surface layer of said second element including a second condenser element co-actively spaced with said first condenser element.

7. A device for connection to a mechanism for adjusting to a selected mechanical value from a multiplicity of mechanical values in said mechanism comprising a housing, a first and second group of elements each having at least one gear being mounted in said housing for independent rotation about a common axis; a first means for simultaneously rotating each of said gears in the same direction, said first means including a rotatable drive means engageable with each of said gears in response to rotation of said drive means, the rate of displacement of said gears being different with respect to each other; a second means coacting with one of said gears in one of said groups of elements and responsive thereto for determining the difference of said rate of displacement of each of said gears; and an output means coacting with and responsive to said second means.

* * * * *